(12) United States Patent
Hirota et al.

(10) Patent No.: US 10,309,694 B2
(45) Date of Patent: Jun. 4, 2019

(54) HEAT PUMP AND COOLING POWER GENERATION METHOD

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Yasuki Hirota, Nagakute (JP); Takafumi Yamauchi, Nagakute (JP); Ryuichi Iwata, Nagakute (JP); Takashi Shimazu, Nagakute (JP); Masaki Morita, Toyota (JP); Manabu Orihashi, Okazaka (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 15/057,690

(22) Filed: Mar. 1, 2016

(65) Prior Publication Data

US 2016/0258658 A1    Sep. 8, 2016

(30) Foreign Application Priority Data

Mar. 3, 2015    (JP) .................................. 2015-041800

(51) Int. Cl.
  *F25B 17/08*    (2006.01)
  *F25B 30/04*    (2006.01)
  (Continued)

(52) U.S. Cl.
  CPC ............ *F25B 17/083* (2013.01); *F25B 30/04* (2013.01); *F25B 41/04* (2013.01); *F25B 49/046* (2013.01); *Y02A 30/278* (2018.01); *Y02B 30/64* (2013.01)

(58) Field of Classification Search
  CPC ........ F25B 17/083; F25B 30/04; F25B 49/04; F25B 49/046; F25B 17/00; F25B 17/02; F25B 17/04; F25B 35/02
  (Continued)

(56) References Cited

U.S. PATENT DOCUMENTS 2,024,083 A * 12/1935 Ephraim ............... F25B 17/083
                                                    62/106
4,333,515 A *  6/1982 Wilkinson ............ F25B 15/006
                                                    62/101
(Continued)

FOREIGN PATENT DOCUMENTS

JP    S57-055369 A    4/1982
JP    2002-372332 A   12/2002
(Continued)

OTHER PUBLICATIONS

Jan. 10, 2017 Office Action issued in Japanese Patent Application No. 2015-041800.

*Primary Examiner* — Frantz F Jules
*Assistant Examiner* — Nelson J Nieves
(74) *Attorney, Agent, or Firm* — Oliff PLC

(57) ABSTRACT

An adsorption heat pump includes: an evaporator/condenser including a section that evaporates a first heat exchange-medium and pipe through which a second heat exchange-medium flows; first adsorption devices, each including an adsorption-section in which the first heat exchange-medium that has been evaporated reacts and retains the first heat exchange-medium, and pipe through which the second heat exchange-medium flows; and second adsorption device in which first heat exchange-medium that has been released from the first adsorption devices reacts and retains the first heat exchange-medium. The adsorption-section of the first adsorption device in a state reacting with the first heat exchange-medium is in communication with the evaporator/
(Continued)

condenser section, and the adsorption-section of the first adsorption device is in a state having adsorbed the first heat exchange-medium is in communication with the second adsorption device adsorption-section, and the first adsorption device pipe is connected to the evaporator/condenser pipe in series, thereby generating cooling.

10 Claims, 11 Drawing Sheets

(51) Int. Cl.
    *F25B 41/04*     (2006.01)
    *F25B 49/04*     (2006.01)

(58) Field of Classification Search
    USPC .................................................. 62/144, 145
    See application file for complete search history.

(56) References Cited

U.S. PATENT DOCUMENTS

| | | | | |
|---|---|---|---|---|
| 4,881,376 | A * | 11/1989 | Yonezawa | F25B 17/083 62/106 |
| 5,161,382 | A * | 11/1992 | Missimer | F25B 9/006 62/335 |
| 5,359,864 | A * | 11/1994 | Yamada | B60H 1/3201 62/430 |
| 5,732,569 | A * | 3/1998 | Sanada | F25B 17/083 62/148 |
| 6,490,875 | B2 * | 12/2002 | Chua | F25B 17/083 62/144 |
| 7,497,089 | B2 | 3/2009 | Kakiuchi et al. | |
| 8,333,079 | B2 | 12/2012 | Kakiuchi et al. | |
| 2006/0245994 | A1 | 11/2006 | Watanabe et al. | |
| 2008/0034785 | A1 * | 2/2008 | Yanagi | F25B 17/083 62/478 |
| 2010/0043462 | A1 * | 2/2010 | Barot | F25B 17/083 62/112 |
| 2013/0091879 | A1 | 4/2013 | Kakiuchi et al. | |
| 2013/0276475 | A1 * | 10/2013 | Aso | F25B 17/083 62/477 |
| 2013/0319028 | A1 * | 12/2013 | Tsubouchi | F25B 30/04 62/238.3 |
| 2014/0053577 | A1 * | 2/2014 | Hirota | F25B 30/04 62/56 |
| 2014/0053579 | A1 * | 2/2014 | Shaikh | F25B 27/00 62/79 |
| 2014/0102121 | A1 * | 4/2014 | Manabe | F25B 41/04 62/101 |
| 2014/0260359 | A1 * | 9/2014 | Aso | H05K 7/20363 62/79 |
| 2015/0159923 | A1 | 6/2015 | Akisawa et al. | |
| 2015/0377525 | A1 | 12/2015 | Hirota et al. | |
| 2016/0177161 | A1 * | 6/2016 | Hanzawa | C09K 5/16 62/4 |

FOREIGN PATENT DOCUMENTS

| | | |
|---|---|---|
| JP | 2003-225653 A | 8/2003 |
| JP | 2004-014444 A | 1/2004 |
| JP | 2005-029461 A | 2/2005 |
| JP | 2005-127632 A | 5/2005 |
| JP | 2014-040959 A | 3/2014 |
| JP | 2014-153029 A | 8/2014 |
| WO | 2014/003013 A1 | 1/2014 |

\* cited by examiner

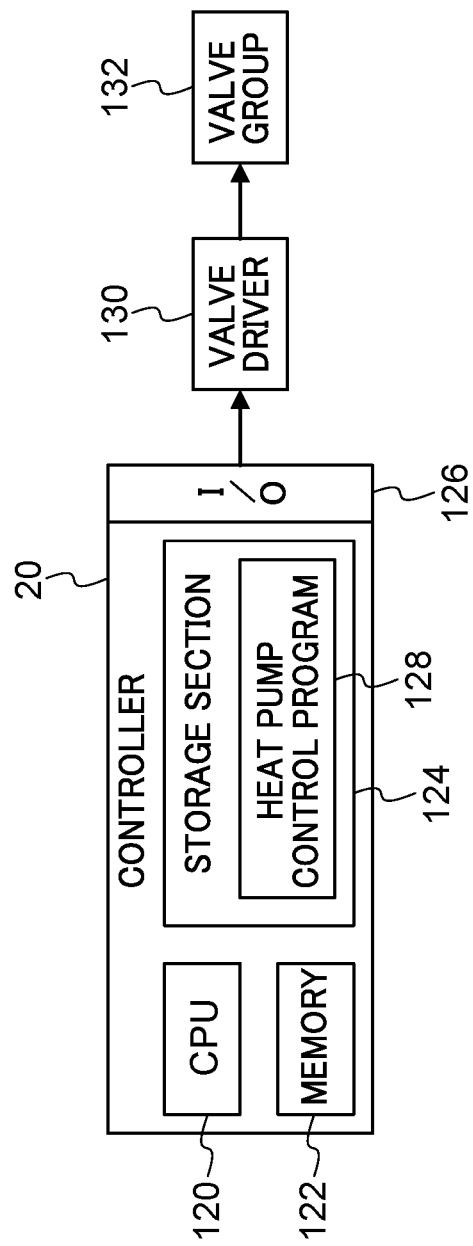

HEAT PUMP AND COOLING POWER GENERATION METHOD

CROSS REFERENCE TO RELATED APPLICATION

This application is based on and claims priority under 35 USC 119 from Japanese Patent Application No. 2015-41800 filed Mar. 3, 2015.

TECHNICAL FIELD

The present invention relates to a heat pump and a cooling power generation method.

RELATED ART

Japanese Patent Application Laid-Open (JP-A) No. 2014-40959 describes an adsorption heat pump including an evaporator, an adsorption device, a heat storage reactor, and a condenser, and is configured to first generate cooling in the evaporator by connecting the evaporator together with the heat storage reactor and connecting the adsorption device together with the condenser, and applying reaction heat generated in the heat storage reactor to the adsorption device to regenerate the adsorption device, and then generating cooling in the evaporator by connecting the evaporator together with the adsorption device.

SUMMARY OF INVENTION

Technical Problem

In adsorption heat pumps, adsorption heat is generated when an adsorbent in the adsorption device adsorbs a heat exchange medium. However, the adsorption amount of the heat exchange medium by the adsorbent changes with the temperature (adsorption temperature) of the adsorbent, and there is a tendency for the adsorption amount to decrease as the adsorption temperature rises. Accordingly, in the technology of Patent Document 1, the adsorption temperature rises due to the adsorption heat, accompanying which the adsorption amount of the adsorption device decreases. The amount of evaporation in the evaporator accordingly also decreases, and so the temperature of the cooling generated in the evaporator rises.

In the technology of Patent Document 1, the above issue is present regardless of which reaction type is utilized by a reactor that reacts with a heat exchange medium and retains the heat exchange medium, out of, for example, physical adsorption, chemical adsorption, absorption, or chemical reactions.

The present invention has been developed in consideration of the above circumstances.

Summary

According to a first aspect of the invention, a heat pump includes: an evaporator including an evaporation section that evaporates a first heat exchange medium and including a flow section through which a second heat exchange medium flows; plural first reactors, each including a reaction section in which the first heat exchange medium that has been evaporated in the evaporator reacts and that retains the first heat exchange medium, and including a flow section through which the second heat exchange medium flows; a second reactor in which the first heat exchange medium, which has been released from the first reactors, reacts and that retains the first heat exchange medium; and a switching section that, in a case in which the reaction section of one or more of the first reactors is placed in communication with the evaporation section of the evaporator, places the reaction section of another of the first reactors in communication with the second reactor, and connects the flow section of the other first reactor that has been placed in communication with the second reactor in series with the flow section of the evaporator.

According to a second aspect of the invention, a cooling power generation method includes: providing an evaporator including an evaporation section that evaporates a first heat exchange medium and including a flow section through which a second heat exchange medium flows; providing a plural of first reactors, each including a reaction section in which the first heat exchange medium that has been evaporated in the evaporator reacts and that retains the first heat exchange medium, and including a flow section through which the second heat exchange medium flows; providing a second reactor in which the first heat exchange medium, which has been released from the first reactors, reacts and that retains the first heat exchange medium; and when the reaction section of one or more of the first reactors is placed in communication with the evaporation section of the evaporator, placing the reaction section of another of the first reactors in communication with the second reactor, and connecting the flow section of the other first reactor that has been placed in communication with the second reactor in series with the flow section of the evaporator.

BRIEF DESCRIPTION OF THE DRAWINGS

Exemplary embodiments of the present invention will be described in detail based on the following figures, wherein:

FIG. 2 is a schematic block diagram of a control system of an adsorption heat pump;

DETAILED DESCRIPTION

Figure 1:
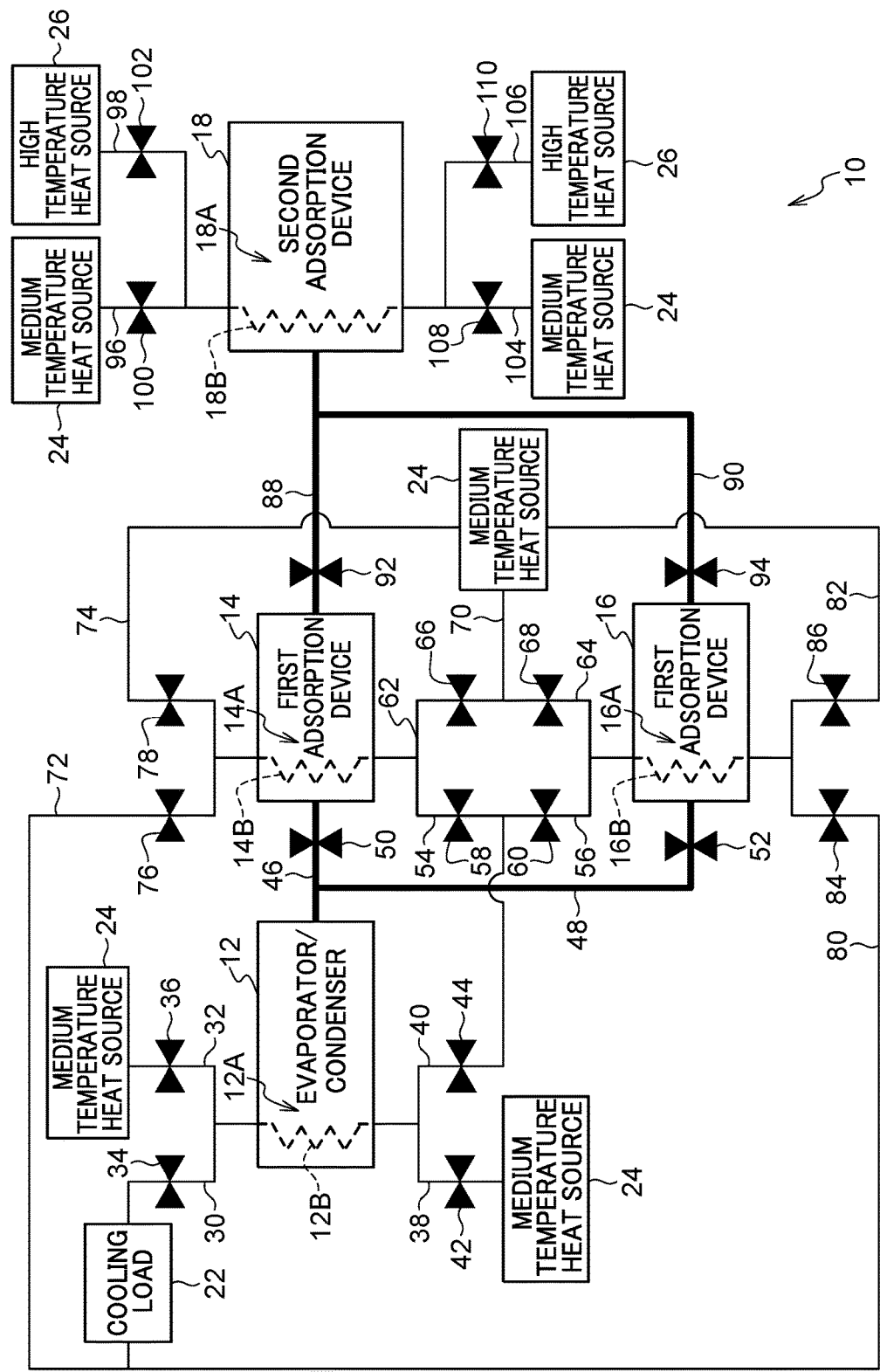
FIG. 1 is a schematic configuration diagram of an adsorption heat pump according to an exemplary embodiment.

Detailed explanation follows regarding an example of an exemplary embodiment of the present invention, with reference to the drawings. FIG. 1 illustrates an adsorption heat pump 10 according to the present exemplary embodiment. The adsorption heat pump 10 includes main configuration elements of an evaporator/condenser 12, first adsorption devices 14, 16, a second adsorption device 18, and a controller 20 (see FIG. 2).

In the present exemplary embodiment, the adsorption heat pump 10 is an example of a heat pump according to the present invention, the evaporator/condenser 12 is an example of an evaporator of the present invention (more specifically, the evaporator of claim 5), and the first adsorption devices 14, 16 are examples of a first reactor of the present invention. Moreover, in the present exemplary embodiment, the second adsorption device 18 is an example of a second reactor of the present invention, and the controller 20 configures an example of a switching section of the present invention together with a valve driver 130, and a valve group 132, described later.

The evaporator/condenser 12 includes an evaporation/condensation section 12A that evaporates and condenses a first heat exchange medium, and a pipe 12B that is disposed inside the evaporation/condensation section and through which flows a second heat exchange medium. At a first cooling power generation step and a second cooling power generation step, described later, the evaporator/condenser 12 generates cooling by evaporating (vaporizing) the first heat exchange medium in the evaporation/condensation section, thereby cooling the second heat exchange medium flowing through the pipe 12B. At a second adsorption device regeneration step, described later, the evaporator/condenser 12 condenses the first heat exchange medium from a vaporized state in the evaporation/condensation section. The evaporation/condensation section 12A of the evaporator/condenser 12 is an example of an evaporation section of an evaporator of the present invention, and the pipe 12B is an example of a flow section of the evaporator of the present invention.

Water or ammonia, for example, may be employed as the first heat exchange medium. Water or ammonia can adsorb and desorb from an adsorbent under the (temperature and pressure) conditions demanded of the adsorption heat pump 10, and can moreover be procured cheaply. However, the first heat exchange medium may also, for example, employ an alcohol with one to four carbon atoms, and may employ a single substance, or a mixture of two or more substances. For example, water or ammonia, or a solution of water and a water-miscible solvent, may be employed as the second heat exchange medium.

Respective pipes 30, 32 are connected at one end to one end of the pipe 12B of the evaporator/condenser 12. The other end of the pipe 30 is connected to a cooling load 22, and the other end of the pipe 32 is connected to a medium temperature heat source 24. Valves 34, 36 are provided partway along the respective pipes 30, 32. The valves 34, 36 are opened and closed by the valve driver 130 (see FIG. 2) that includes a motor and the like. In FIG. 2, the respective valves provided in the adsorption heat pump 10 are illustrated collectively as a "valve group 132". The valve driver 130 is connected to the controller 20 (see FIG. 2), and the controller 20 controls opening and closing of the valves 34, 36 so as to open and close the valves 34, 36 selectively. The second heat exchange medium is thereby selectively supplied to the pipe 12B of the evaporator/condenser 12 from the cooling load 22, or from the medium temperature heat source 24.

Specific examples of the cooling load 22 are not particularly limited; however, the cooling load 22 may be an air conditioning load, and more specifically, an external unit of an air conditioning device. In the present exemplary embodiment, the second heat exchange medium is supplied from the cooling load 22 at, for example, 30° C.

Specific examples of the medium temperature heat source 24 are not particularly limited, as long as the medium temperature heat source 24 has a higher temperature than the cooling generated by the adsorption heat pump 10. For example, coolant water of an internal combustion engine may be employed as the medium temperature heat source 24 in cases in which the adsorption heat pump 10 is provided in a vehicle installed with an internal combustion engine. In the present exemplary embodiment, the second heat exchange medium is supplied from the medium temperature heat source 24 at, for example, 40° C.

Respective pipes 38, 40 are connected at one end to the other end of the pipe 12B of the evaporator/condenser 12. The other end of the pipe 38 is connected to the medium temperature heat source 24, and the other end of the pipe 40 is connected to one end of respective pipes 54, 56. Valves 42, 44 are provided partway along the respective pipes 38, 40. The valves 42, 44 are opened and closed by the valve driver 130 (see FIG. 2), and the controller 20 controls opening and closing of the valves 42, 44 so as to open and close the valves 42, 44 selectively.

The first adsorption device 14 includes an adsorption section 14A that is provided with an adsorbent to adsorb the first heat exchange medium, and that adsorbs and releases (desorbs) the first heat exchange medium, and a pipe 14B that is disposed in the adsorption section 14A and through which the second heat exchange medium flows. The first adsorption device 16 has a similar structure to the first adsorption device 14, and includes an adsorption section 16A that is provided with an adsorbent to adsorb the first heat exchange medium, and that adsorbs and releases the first heat exchange medium, and a pipe 16B that is disposed in the adsorption section 16A and through which the second heat exchange medium flows. In the present exemplary embodiment, AQSOA-Z05 (AQSOA is a registered trademark of Mitsubishi Plastics, Inc.) is employed as the adsorbent of the adsorption sections 14A, 16A of the first adsorption devices 14, 16; however, the present invention is not limited thereto, and, for example, the adsorbent may be AQSOA-Z01, activated carbon, mesoporous silica, a zeolite, silica gel, clay mineral, or the like.

The adsorption sections 14A, 16A of the first adsorption devices 14, 16 are examples of reaction sections of first reactors of the present invention, and the pipes 14B, 16B of the first adsorption devices 14, 16 are examples of flow sections of the first reactors of the present invention. AQSOA-Z05 is an example of the reactant of claim 3.

Respective pipes 46, 48 are connected at one end to the evaporation/condensation section of the evaporator/condenser 12. The other end of the pipe 46 is connected to the adsorption section 14A of the first adsorption device 14, such that the evaporation/condensation section 12A of the evaporator/condenser 12 and the adsorption section 14A of the first adsorption device 14 are in communication with each other through the pipe 46. Similarly, the other end of the pipe 48 is connected to the adsorption section 16A of the first adsorption device 16, such that the evaporation/condensation section 12A of the evaporator/condenser 12 and the adsorption section 16A of the first adsorption device 16 are in communication with each other through the pipe 48. Valves 50, 52 are provided partway along the respective pipes 46, 48. The valves 50, 52 are opened and closed by the valve driver 130 (see FIG. 2), and opening and closing of the valves 50, 52 is controlled by the controller 20.

One end of the pipe 54 is connected to one end of the pipe 14B of the first adsorption device 14, and one end of the pipe 56 is connected to one end of the pipe 16B of the first adsorption device 16. Valves 58, 60 are provided partway along the respective pipes 54, 56. The valves 58, 60 are opened and closed by the valve driver 130 (see FIG. 2), and opening and closing of the valves 50, 52 is controlled by the controller 20.

One end of a pipe 62 is also connected to the one end of the pipe 14B of the first adsorption device 14, and one end of a pipe 64 is also connected to the one end of the pipe 16B of the first adsorption device 16. The other ends of the pipes 62, 64 are connected to each other. Valves 66, 68 are provided partway along the respective pipes 62, 64. The valves 66, 68 are opened and closed by the valve driver 130 (see FIG. 2), and opening and closing of the valves 66, 68 is controlled by the controller 20. One end of a pipe 70 is connected to the connection portion of the other ends of the pipes 62, 64, and the other end of the pipe 70 is connected to the medium temperature heat source 24.

The other end of the pipe 14B of the first adsorption device 14 is connected to one end of respective pipes 72, 74. The other end of the pipe 72 is connected to the cooling load 22, and the other end of the pipe 74 is connected to the medium temperature heat source 24. Valves 76, 78 are provided partway along the respective pipes 72, 74. The valves 76, 78 are opened and closed by the valve driver 130 (see FIG. 2), and opening and closing of the valves 76, 78 is controlled by the controller 20.

The other end of the pipe 16B of the first adsorption device 16 is connected to one end of respective pipes 80, 82. The other end of the pipe 80 is connected to the cooling load 22, and the other end of the pipe 82 is connected to the medium temperature heat source 24. Valves 84, 86 are provided partway along the pipes 80, 82. The valves 84, 86 are opened and closed by the valve driver 130 (see FIG. 2), and opening and closing of the valves 84, 86 is controlled by the controller 20.

Similarly to the first adsorption devices 14, 16 described above, the second adsorption device 18 includes an adsorption section 18A that is provided with an adsorbent to adsorb the first heat exchange medium, and that adsorbs and releases the first heat exchange medium, and a pipe 18B that is disposed in the adsorption section 18A and through which the second heat exchange medium flows. In the present exemplary embodiment, a Y zeolite is employed as the adsorbent of the adsorption section 18A of the second adsorption device 18; however, the present invention is not limited thereto, and, for example, the adsorbent may be activated carbon, mesoporous silica, a zeolite, silica gel, clay mineral, or the like. The adsorption capacity of the adsorption section 18A of the second adsorption device 18 with respect to the first heat exchange medium is greater than (for example twice or more) the adsorption capacity of the respective adsorption sections 14A, 16A of the first adsorption devices 14, 16 with respect to the first heat exchange medium. The second adsorption device 18 is an example of a second reactor of the present invention, and the Y zeolite is an example of the reactant of claim 4.

One end of a pipe 88 is connected to the adsorption section 14A of the first adsorption device 14. The other end of the pipe 88 is connected to the adsorption section 18A of the second adsorption device 18, such that the adsorption section 14A of the first adsorption device 14 and the adsorption section 18A of the second adsorption device 18 are in communication with each other through the pipe 88. Similarly, one end of a pipe 90 is connected to the adsorption section 16A of the first adsorption device 16. The other end of the pipe 90 is connected to the adsorption section 18A of the second adsorption device 18, such that the adsorption section 16A of the first adsorption device 16 and the adsorption section 18A of the second adsorption device 18 are in communication with each other through the pipe 90. Valves 92, 94 are provided partway along the respective pipes 88, 90. The valves 92, 94 are opened and closed by the valve driver 130 (see FIG. 2), and opening and closing of the valves 92, 94 is controlled by the controller 20.

One ends of respective pipes 96, 98 are connected to one end of the pipe 18B of the second adsorption device 18. The other end of the pipe 96 is connected to the medium temperature heat source 24, and the other end of the pipe 98 is connected to a high temperature heat source 26. Valves 100, 102 are provided partway along the respective pipes 96, 98. The valves 100, 102 are opened and closed by the valve driver 130 (see FIG. 2), and opening and closing of the valves 100, 102 is controlled by the controller 20.

One ends of respective pipes 104, 106 are connected to the other end of the pipe 18B of the second adsorption device 18. The other end of the pipe 104 is connected to the medium temperature heat source 24, and the other end of the pipe 106 is connected to the high temperature heat source 26. Valves 108, 110 are provided partway along the respective pipes 104, 106. The valves 108, 110 are opened and closed by the valve driver 130 (see FIG. 2), and opening and closing of the valves 108, 110 is controlled by the controller 20.

Specific examples of the high temperature heat source 26 are not particularly limited, as long as the high temperature heat source 26 is at a higher temperature than the medium temperature heat source 24. For example, exhaust gas of the internal combustion engine may be employed as the high temperature heat source 26 in cases in which the adsorption heat pump 10 is provided to a vehicle installed with an internal combustion engine. In the present exemplary embodiment, the second heat exchange medium is supplied from the high temperature heat source 26 at, for example, 200° C.

As illustrated in FIG. 2, the controller 20 includes a CPU 120, memory 122 containing ROM, RAM, or the like, a non-volatile storage section 124 containing a hard disk drive or flash memory, and an input/output (I/O) interface section 126. The CPU 120 is installed with a heat pump control program 128 for performing heat pump control processing, described later. The valve driver 130 previously described is connected to the I/O interface section 126.

Figure 3A:
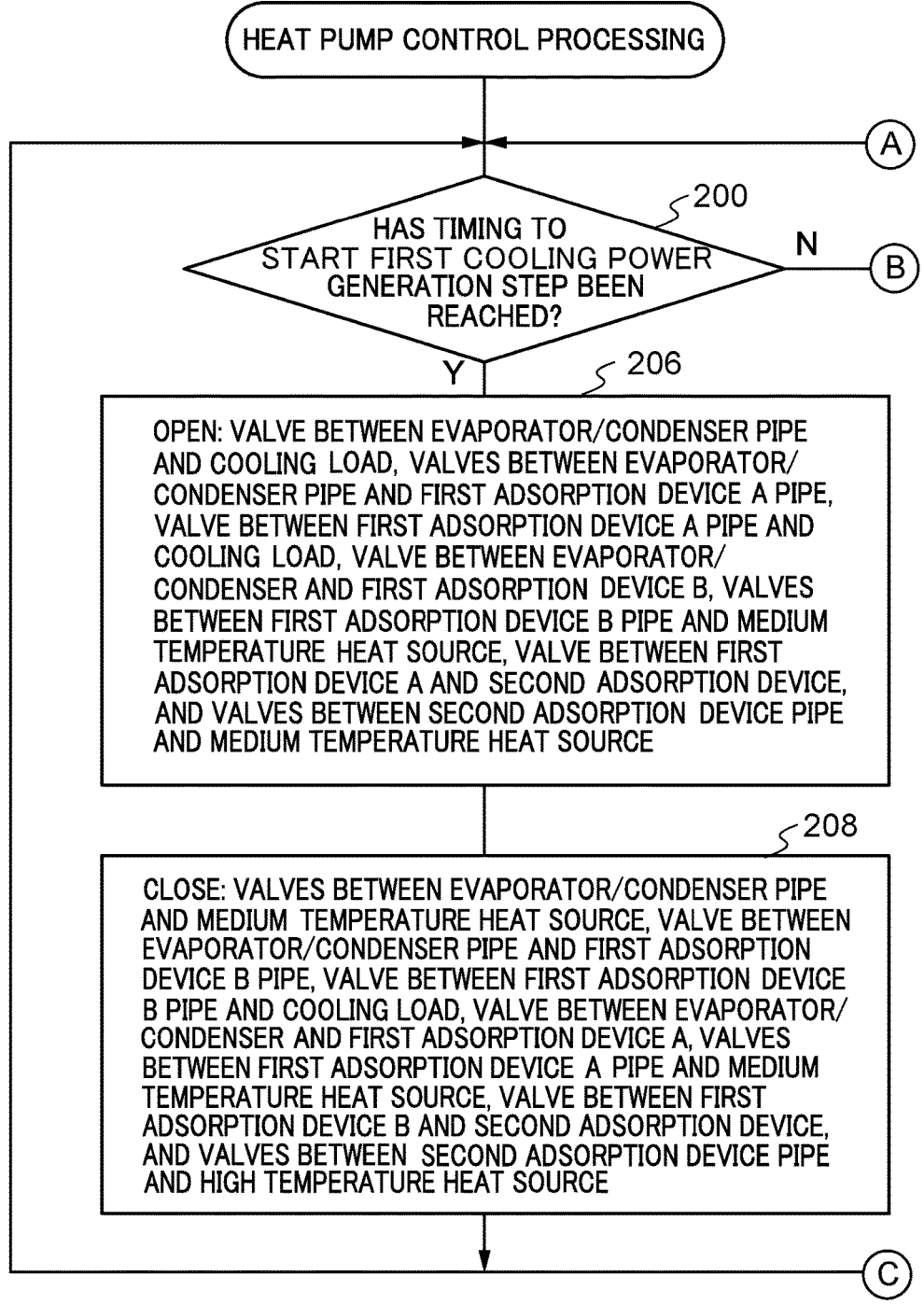
FIGS. 3A, 3B and 3C are flowcharts illustrating contents of heat pump control processing.
Figure 3B:
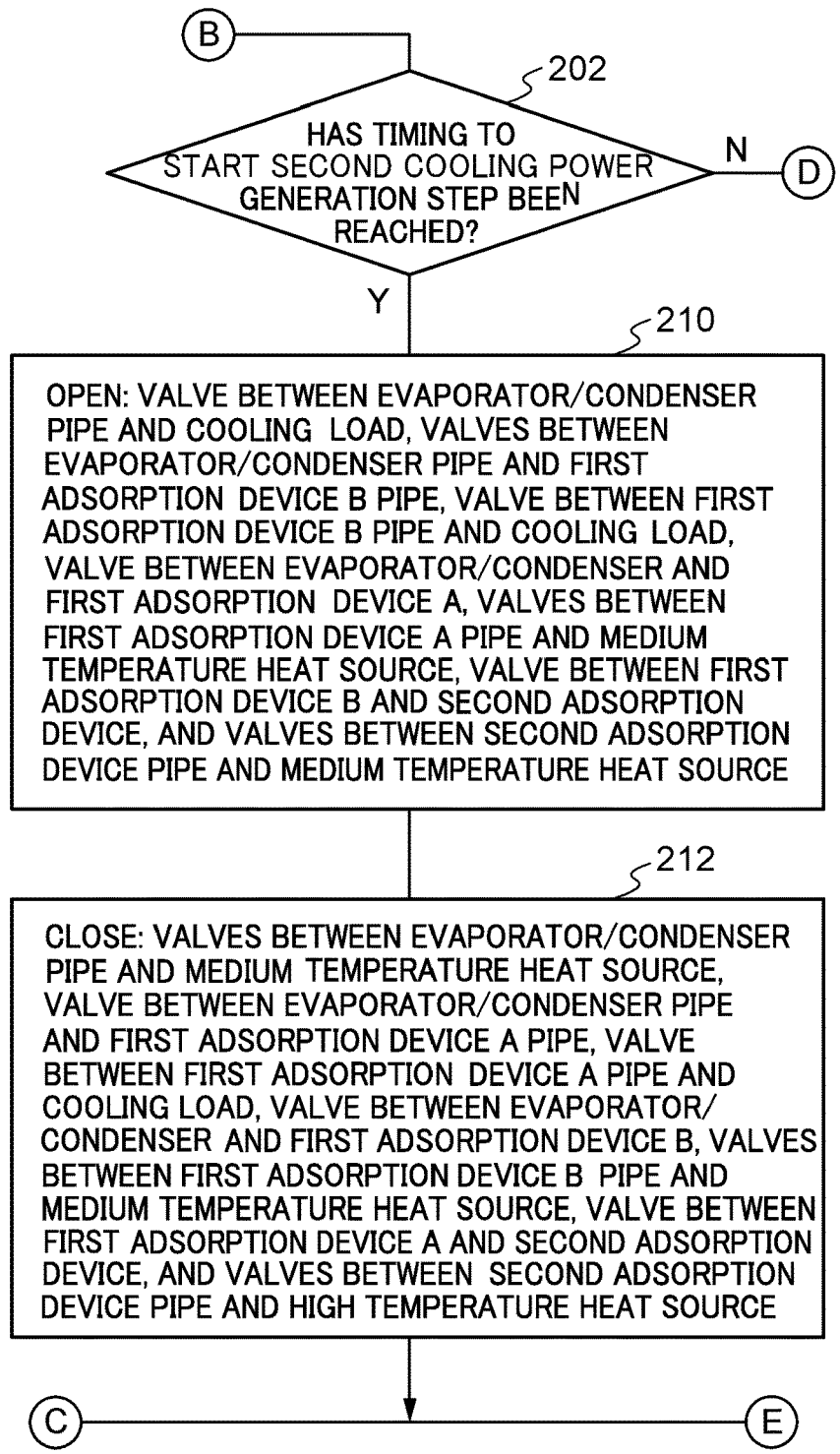
Figure 3C:
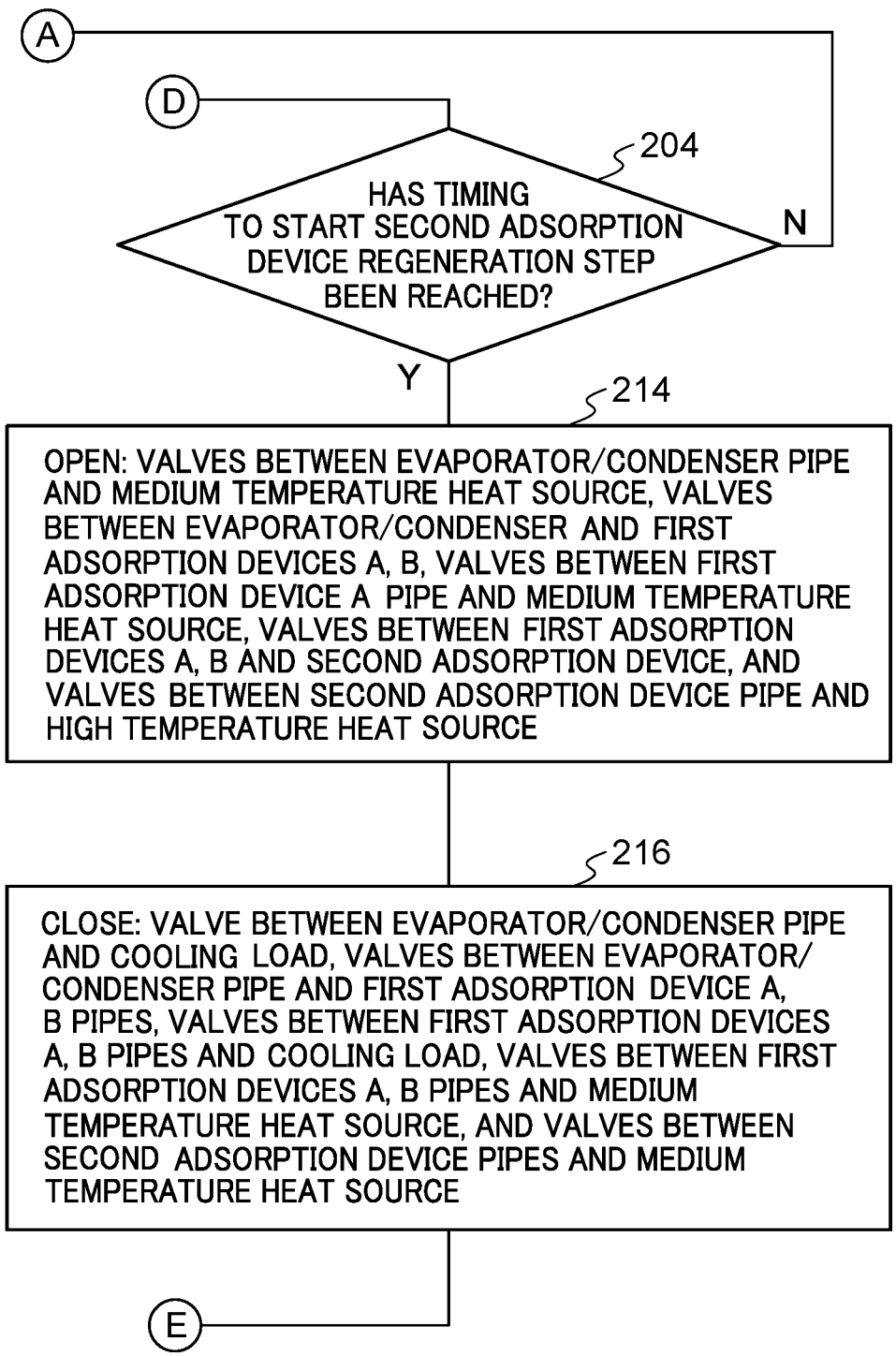

Next, explanation follows regarding operation of the present exemplary embodiment. The controller 20 of the adsorption heat pump 10 performs the heat pump control processing illustrated in FIGS. 3A, 3B and 3C while being supplied with electrical power. The heat pump control processing is processing applied with the cooling power generation method according to the present invention.

The adsorption heat pump 10 according to the present exemplary embodiment performs operational steps of the first cooling power generation step, the second cooling power generation step, and the second adsorption device regeneration step. Each step is described in detail below. Briefly, however, at the first cooling power generation step, first heat exchange medium that has been evaporated in the evaporator/condenser 12 is adsorbed in the adsorption section 16A of the first adsorption device 16, and first heat exchange medium that has been released from the adsorption section 14A of the first adsorption device 14 is adsorbed in the adsorption section 18A of the second adsorption device 18, thereby generating cooling in the evaporator/condenser 12 and the first adsorption device 14.

At the second cooling power generation step, first heat exchange medium that has been evaporated in the evaporator/condenser 12 is adsorbed in the adsorption section 14A of the first adsorption device 14, and first heat exchange medium that has been released from the adsorption section 16A of the first adsorption device 16 is adsorbed in the adsorption section 18A of the second adsorption device 18, thereby generating cooling in the evaporator/condenser 12 and the first adsorption device 16. At the second adsorption device regeneration step, first heat exchange medium is released from the adsorption section 18A of the second adsorption device 18 and condensed in the evaporator/condenser 12, thereby regenerating the second adsorption device 18.

At step 200 of the heat pump control processing, the controller 20 determines whether or not a timing to start the first cooling power generation step has been reached. The controller 20 transitions to step 202 in cases in which determination is negative at step 200, and at step 202, the controller 20 determines whether or not a timing to start the second cooling power generation step has been reached. The controller 20 transitions to step 204 in cases in which determination is negative at step 202, and at step 204, the controller 20 determines whether or not a timing to start the second adsorption device regeneration step has been reached. The controller 20 returns to step 200 in cases in which determination is negative at step 204, and steps 200 to 204 are repeated until determination is affirmative at any one of steps 200 to 204.

In the present exemplary embodiment, as an example of an execution sequence of the respective steps, a pattern may be configured in which the first cooling power generation step and the second cooling power generation step are repeated alternately, to be interrupted by execution of the second adsorption device regeneration step at a point in time when regeneration of the second adsorption device 18 has become necessary. Appropriate values for continuation durations of the first cooling power generation step and the second cooling power generation step may, for example, be derived by testing in advance, and the first cooling power generation step, continuing for a duration corresponding to the appropriate value, followed by the second cooling power generation step, continuing for a duration corresponding to the appropriate value, may be performed repeatedly. Alternatively, the temperature of the first heat exchange medium may be detected and relative pressures, described later, computed, with the continuation durations of the first cooling power generation step and the second cooling power generation step being determined based on the computed relative pressures.

A timing for interruption with execution of the second adsorption device regeneration step may, for example, be determined based on whether or not the number of cycles of the first cooling power generation step and the second cooling power generation step has reached a specific number. Alternatively, the timing for interruption with execution of the second adsorption device regeneration step may, for example, be determined based on whether or not the length of time elapsed since the second adsorption device regeneration step was last performed has exceeded a specific length of time. An appropriate value for the continuation duration of the second adsorption device regeneration step may, for example, be derived by testing in advance, with the second adsorption device regeneration step being continued for a duration corresponding to the appropriate value.

First Cooling Power Generation Step

Figure 4:
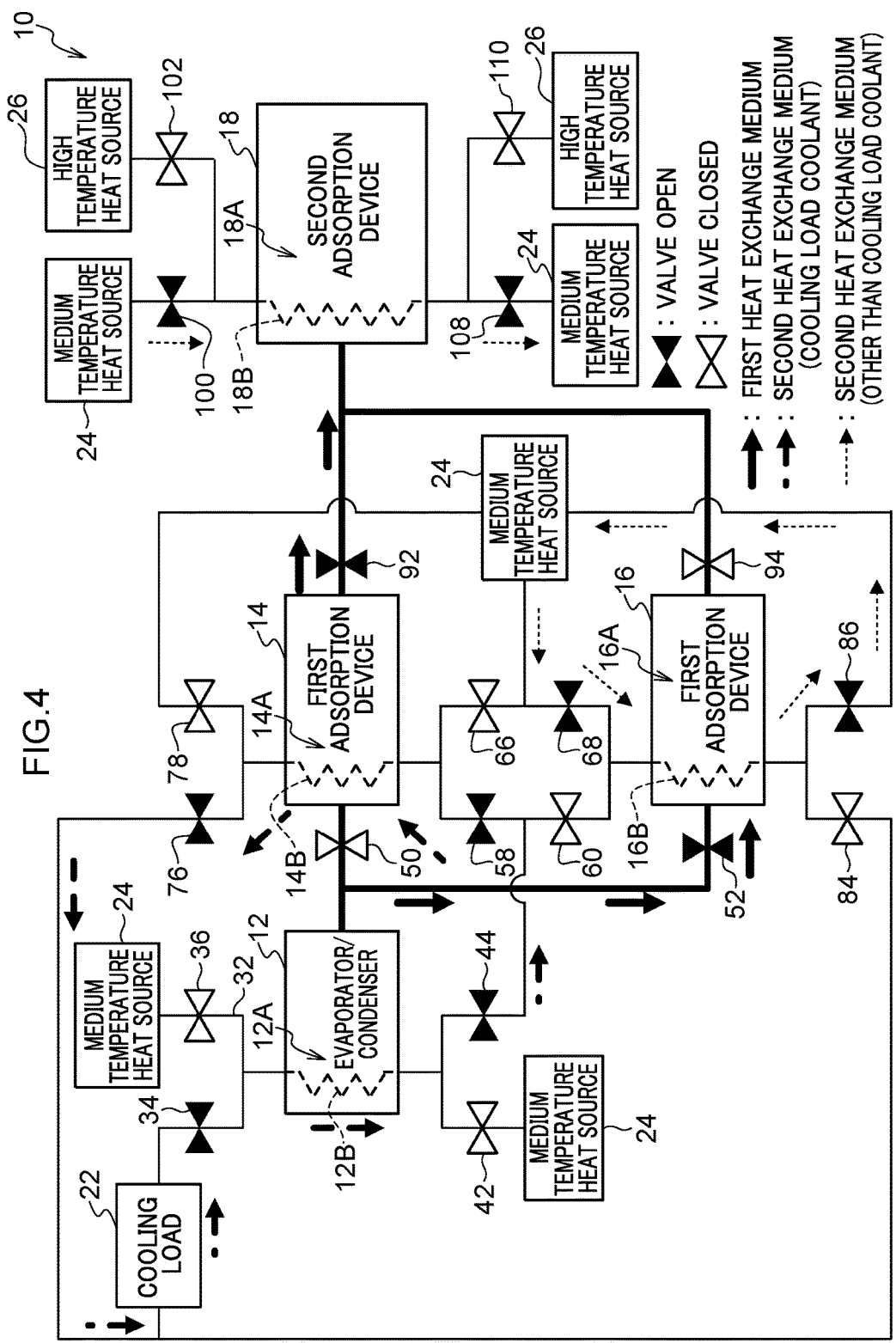
FIG. 4 is an explanatory diagram illustrating a state of an adsorption heat pump at a first cooling power generation step.

When the timing for starting the first cooling power generation step is reached, determination is affirmative at step 200, and the controller 20 transitions to step 206. At step 206, as illustrated in FIG. 4, the controller 20 opens each of the valve 34 between the pipe 12B of the evaporator/condenser 12 and the cooling load 22, the valves 44, 58 between the pipe 12B of the evaporator/condenser 12 and the pipe 14B of the first adsorption device 14, and the valve 76 between the pipe 14B of the first adsorption device 14 and the cooling load 22. The controller 20 moreover opens each of the valve 52 between the evaporation/condensation section 12A of the evaporator/condenser 12 and the adsorption section 16A of the first adsorption device 16, the valves 68, 86 between the pipe 16B of the first adsorption device 16 and the medium temperature heat source 24, the valve 92 between the adsorption section 14A of the first adsorption device 14 and the adsorption section 18A of the second adsorption device 18, and the valves 100, 108 between the pipe 18B of the second adsorption device 18 and the medium temperature heat source 24.

At the next step 208, as illustrated in FIG. 4, the controller 20 closes each of the valves 36, 42 between the pipe 12B of the evaporator/condenser 12 and the medium temperature heat source 24, the valve 60 between the pipe 12B of the evaporator/condenser 12 and the pipe 16B of the first adsorption device 16, the valve 84 between the pipe 16B of the first adsorption device 16 and the cooling load 22, and valve 50 between the evaporation/condensation section 12A of the evaporator/condenser 12 and the adsorption section 14A of the first adsorption device 14. The controller 20 also closes each of the valves 66, 78 between the pipe 14B of the first adsorption device 14 and the medium temperature heat source 24, the valve 94 between the adsorption section 16A of the first adsorption device 16 and the adsorption section 18A of the second adsorption device 18, and the valves 102, 110 between the pipe 18B of the second adsorption device 18 and the high temperature heat source 26. Processing returns to step 200 once the processing of step 208 has been performed.

By opening and closing the valve group 132 as described above, as illustrated in FIG. 4, at the first cooling power generation step, the first heat exchange medium that has been evaporated in the evaporator/condenser 12 is supplied from the evaporator/condenser 12 to the adsorption section 16A of the first adsorption device 16. The adsorbent of the adsorption section 16A reacts with the first heat exchange medium supplied to the adsorption section 16A, and adsorbs the first heat exchange medium.

Suppose a temperature T1 of the cooling generated in the adsorption heat pump 10 is 15° C., and a temperature T2 of the second heat exchange medium supplied from the medium temperature heat source 24 to the pipe 16B of the first adsorption device 16 is 30° C. The relative pressure $\varphi 2$ in the adsorption section 16A of the first adsorption device 16 is $\varphi 2 = P1/P2$, where P1 is the saturated vapor pressure at the temperature T1 of the evaporator/condenser 12 and P2 is the saturated vapor pressure at the temperature T2 of the adsorption section 16A of the first adsorption device 16. For example, $\varphi 2 \approx 0.348$ when P1=1.5 kPa and P2=4.3 kPa.

Figure 7:
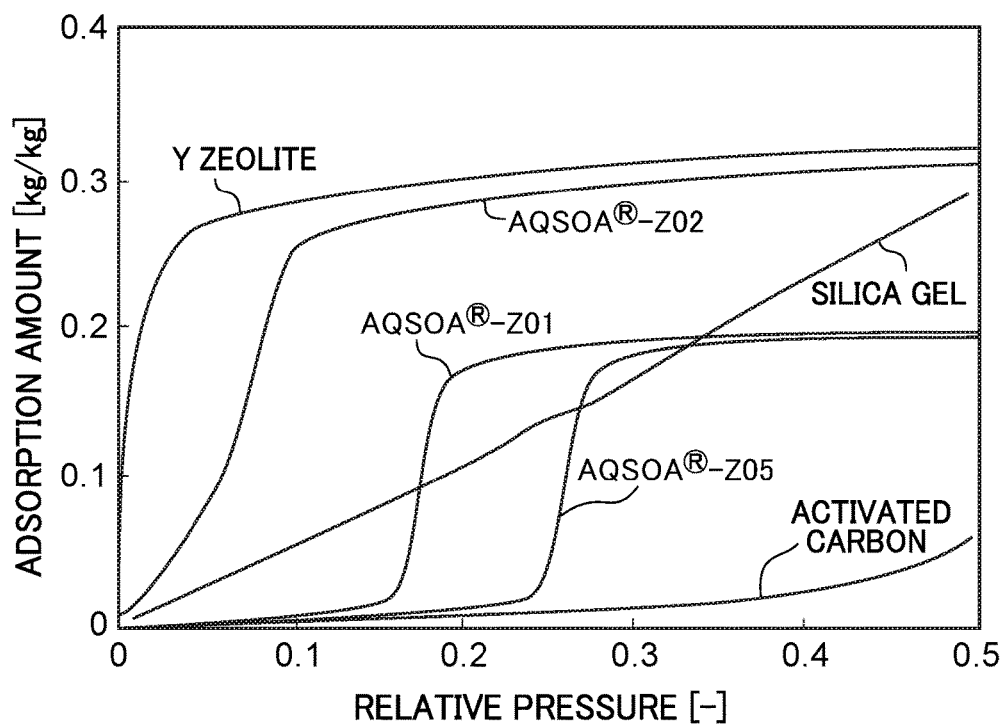
FIG. 7 is a line graph illustrating adsorption isotherms of various adsorbents.

FIG. 7 illustrates a relationship between relative pressure and adsorption amount for various adsorbents that may be employed in the adsorption section 14A of the first adsorption device 14 and the adsorption section 16A of the first adsorption device 16, and in the adsorption section 18A of the second adsorption device 18. As illustrated in FIG. 7, when AQSOA-Z05 is employed as the adsorbent in the adsorption section 16A of the first adsorption device 16, nearly all of the adsorbable first heat exchange medium can be adsorbed when the relative pressure φ2 is 0.348.

At the first cooling power generation step, opening the valve 92 places the adsorption section 14A of the first adsorption device 14, this being in a state in which the first heat exchange medium has been adsorbed at the previous second cooling power generation step, in communication with the adsorption section 18A of the second adsorption device 18. The second heat exchange medium is supplied from the medium temperature heat source 24 to the pipe 18B of the second adsorption device 18 by opening the valves 100, 108. The first heat exchange medium that was adsorbed by the adsorption section 14A of the first adsorption device 14 is thereby released (desorbed) from the adsorption section 14A, and is adsorbed by the adsorption section 18A of the second adsorption device 18.

Suppose a temperature T1 of the adsorption section 14A of the first adsorption device 14 is 15° C., and a temperature T2 of the second heat exchange medium supplied from the medium temperature heat source 24 to the pipe 18B of the second adsorption device 18 is 30° C. The relative pressure φ1 of the adsorption section 14A of the first adsorption device 14 is defined as φ1=P3/P4, where P3 is the equilibrium pressure at the temperature T2 of the adsorption section 18A of the second adsorption device 18, and P4 is the saturated vapor pressure at the temperature T1 of the adsorption section 14A of the first adsorption device 14. In practice, P4≈P1.

In the present exemplary embodiment, the adsorption section 18A of the second adsorption device 18 employs a Y zeolite as the adsorbent. In the adsorption isotherm of the Y zeolite illustrated in FIG. 7, in a hypothetical case in which the Y zeolite is employed until the relative pressure φ1 reaches 0.05, the equilibrium pressure P3 at the temperature T2 of the adsorption section 18A of the second adsorption device 18 is P3=P2×0.05=4.3 kPa×0.05=0.215 kPa.

Accordingly, φ1=0.143. As is clear from FIG. 7, AQSOA-Z05, this being the adsorbent of the adsorption section 14A of the first adsorption device 14, is capable of desorbing nearly all of the adsorbable first heat exchange medium when relative pressure is 0.143.

Figure 8:
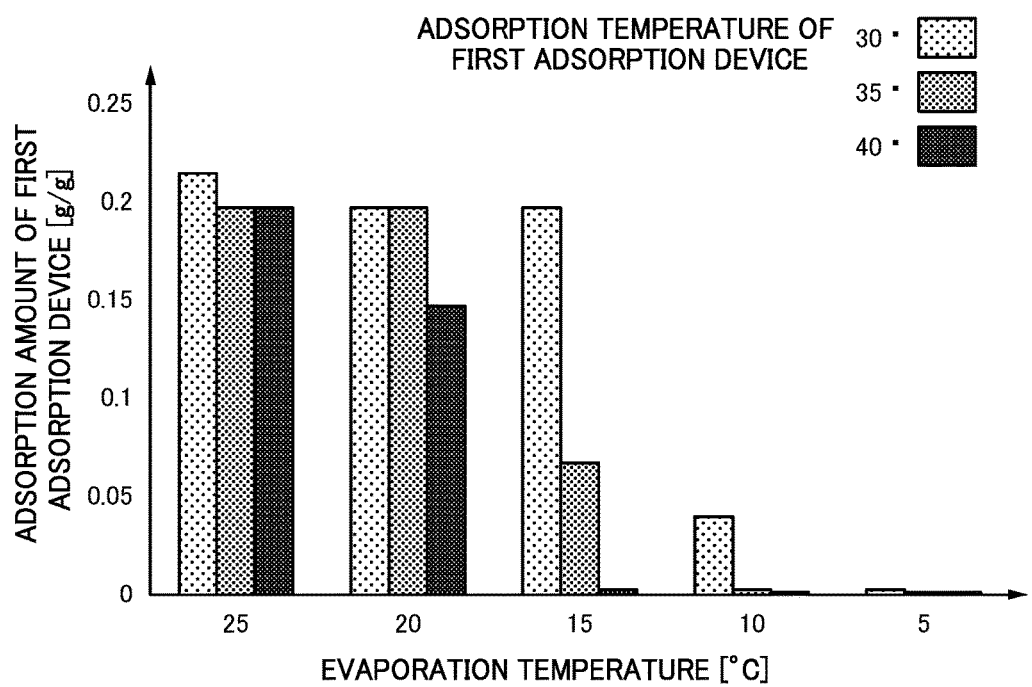
FIG. 8 is a bar graph illustrating changes in a relationship between the evaporation temperature in an evaporator/condenser and the adsorption amount of a first adsorption device with changes in the adsorption temperature of the first adsorption device when employing AQSOA-Z05 as an adsorbent.

Note that the above explanation hypothesizes a case in which the temperature T2 of the second heat exchange medium supplied from the medium temperature heat source 24 is 30° C. However, in the present exemplary embodiment, the second heat exchange medium is supplied from the medium temperature heat source 24 at a temperature T2 of 40° C., and so the temperature (adsorption temperature) T2 of the adsorption section 16A of the first adsorption device 16 is also 40° C. As illustrated in FIG. 8, in the first adsorption device 16, in which AQSOA-Z05 is employed as the adsorbent, if the adsorption temperature T2 is 30° C., nearly all of the adsorbable first heat exchange medium can be adsorbed even when the temperature T1 of the evaporator/condenser 12 is 15° C. However, when the adsorption temperature T2 rises to 35° C., the adsorption amount of the first heat exchange medium by the first adsorption device 16 decreases markedly when the temperature T1 of the evaporator/condenser 12 is 15° C. Moreover, when the adsorption temperature T2 rises to 40° C., the first adsorption device 16 becomes almost incapable of adsorbing the first heat exchange medium when the temperature T1 of the evaporator/condenser 12 is 15° C.

Accordingly, in the adsorption heat pump 10 according to the present exemplary embodiment, when the temperature of the second heat exchange medium supplied from the medium temperature heat source 24 reaches a comparatively high temperature (for example, 40° C.), it becomes difficult to generate cooling at a temperature T1 of 15° C. in the evaporator/condenser 12 by adsorption of the first heat exchange medium in the first adsorption device 16 alone.

Figure 9:
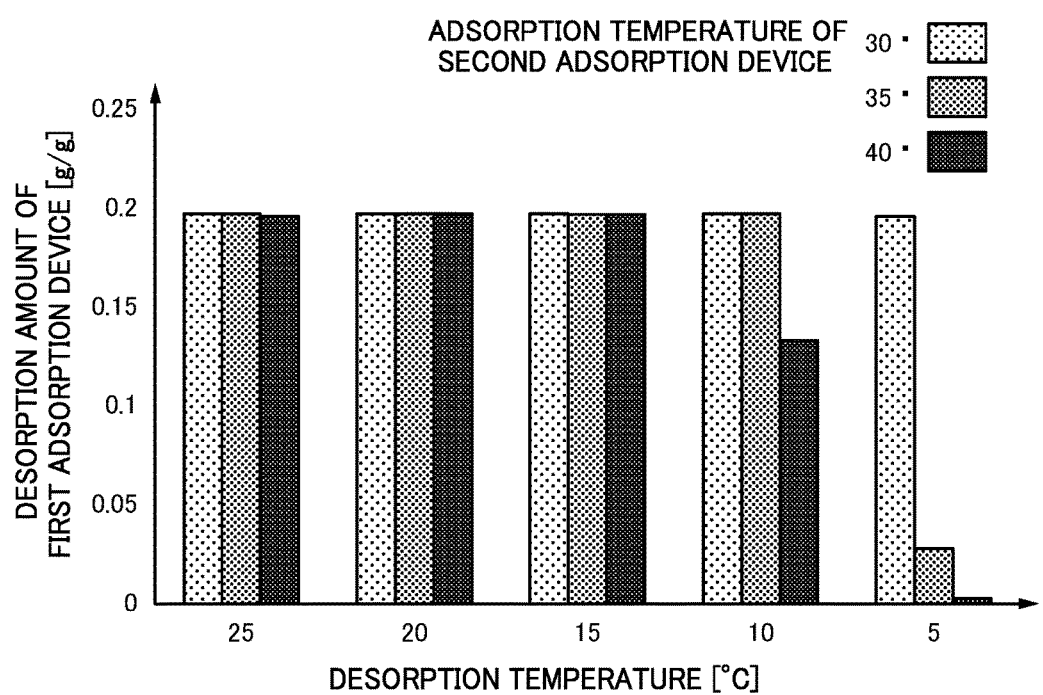
FIG. 9 is a bar graph illustrating changes in a relationship between the desorption temperature in a first adsorption device and the desorption amount from the first adsorption device with changes in the adsorption temperature of a second adsorption device when employing a Y zeolite as an adsorbent.

Conversely, as illustrated in FIG. 9, in the second adsorption device 18 that employs the Y zeolite as the adsorbent, when the desorption temperature T1 of the adsorption section 14A of the first adsorption device 14 is 15° C., there is almost no reduction in the desorption amount of the first heat exchange medium from the adsorption section 14A of the first adsorption device 14 (the adsorption amount of the first heat exchange medium by the adsorption section 18A of the second adsorption device 18) even when the adsorption temperature T2 rises from 30° C. to 40° C. Cooling can accordingly be generated accompanying desorption of the first heat exchange medium from the adsorption section 14A in the first adsorption device 14.

At the first cooling power generation step, opening the valves 44, 58, 76 connects together the pipe 12B of the evaporator/condenser 12, the pipe 14B of the first adsorption device 14, and the cooling load 22 in series, and the second heat exchange medium flows around a circulation path formed by these connections (a circulation path circulating around the cooling load 22→pipe 30→pipe 12B of the evaporator/condenser 12→pipe 40→pipe 54→pipe 14B of the first adsorption device 14→pipe 72→cooling load 22).

The cooling generated by the evaporator/condenser 12 and the cooling generated by the first adsorption device 14 are accordingly superimposed, and the second heat exchange medium supplied from the medium temperature heat source 24 is at a temperature of 40° C. Even under these conditions, for example, the second heat exchange medium supplied from the cooling load 22 to the pipe 12B of the evaporator/condenser 12 at a temperature of 30° C. is cooled to 23° C. at the exit of the evaporator/condenser 12, and cooled to 14° C. at the exit of the first adsorption device 14, before being supplied to the cooling load 22. Moreover, at the first cooling power generation step, as described above, nearly all of the first heat exchange medium that was adsorbed by the adsorption section 14A of the first adsorption device 14 is desorbed, and then adsorbed by the adsorbent of the adsorption section 18A of the second adsorption device 18, thereby regenerating the adsorption section 14A of the first adsorption device 14.

Second Cooling Power Generation Step

Figure 5:
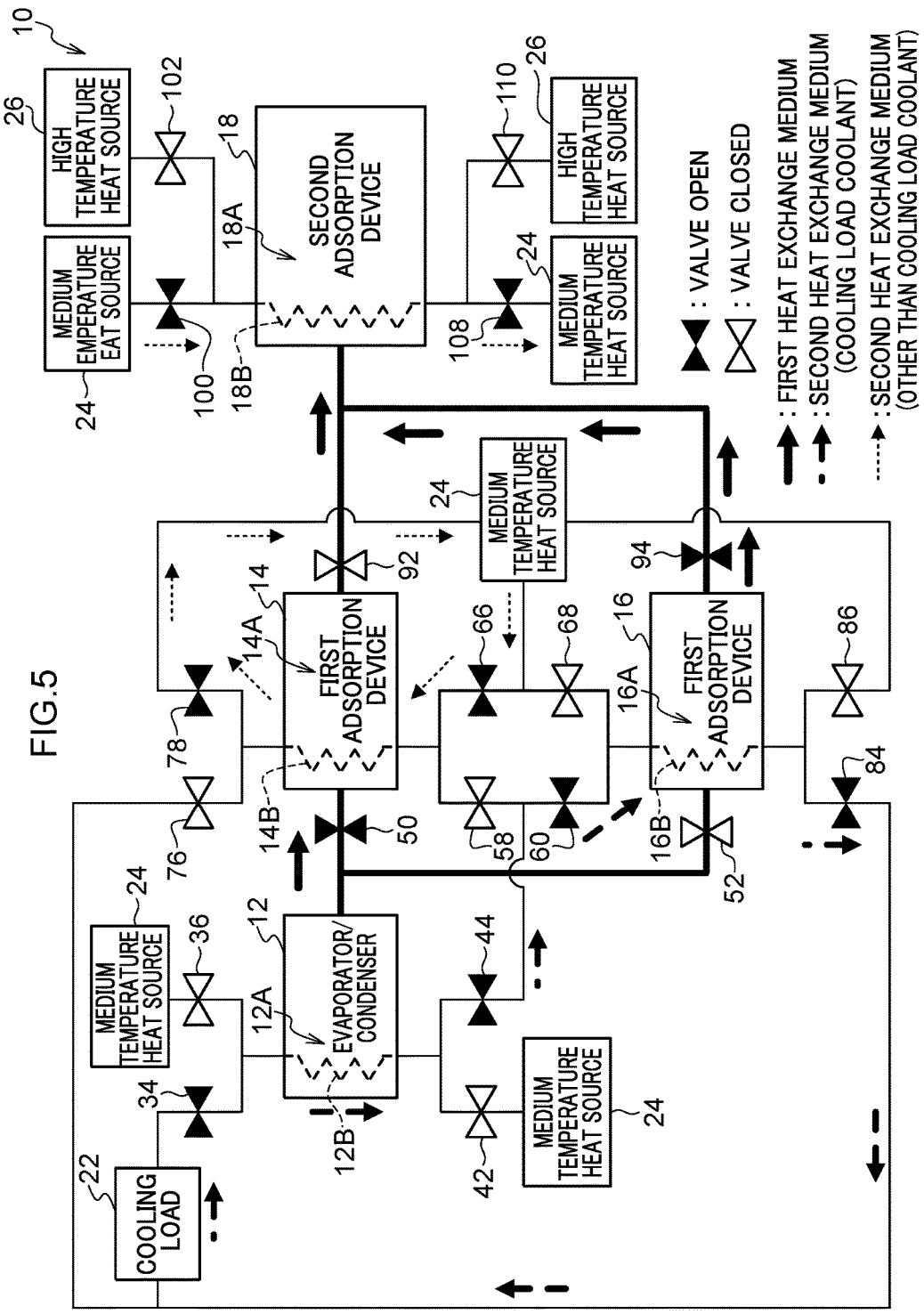
FIG. 5 is an explanatory diagram illustrating a state of an adsorption heat pump at a second cooling power generation step.

When the timing for starting the second cooling power generation step is reached, determination is affirmative at step 202, and the controller 20 transitions to step 210. At step 210, as illustrated in FIG. 5, the controller 20 opens each of the valve 34 between the pipe 12B of the evaporator/condenser 12 and the cooling load 22, the valves 44, 60 between the pipe 12B of the evaporator/condenser 12 and the pipe 16B of the first adsorption device 16, the valve 84 between the pipe 16B of the first adsorption device 16 and the cooling load 22, and the valve 50 between the evaporation/condensation section 12A of the evaporator/condenser 12 and the adsorption section 14A of the first adsorption device 14. The controller 20 also opens each of the valves 66, 78 between the pipe 14B of the first adsorption device 14 and the medium temperature heat source 24, the valve 94 between the adsorption section 16A of the first adsorption device 16 and the adsorption section 18A of the second adsorption device 18, and the valves 100, 108 between the pipe 18B of the second adsorption device 18 and the medium temperature heat source 24.

At the next step 212, as illustrated in FIG. 5, the controller 20 closes each of the valves 36, 42 between the pipe 12B of the evaporator/condenser 12 and the medium temperature heat source 24, the valve 58 between the pipe 12B of the evaporator/condenser 12 and the pipe 14B of the first adsorption device 14, the valve 76 between the pipe 14B of the first adsorption device 14 and the cooling load 22, and the valve 52 between the evaporation/condensation section 12A of the evaporator/condenser 12 and the adsorption section 16A of the first adsorption device 16. The controller 20 also closes each of the valves 68, 86 between the pipe 16B of the first adsorption device 16 and the medium temperature heat source 24, the valve 92 between the adsorption section 14A of the first adsorption device 14 and the adsorption section 18A of the second adsorption device 18, and the valves 102, 110 between the pipe 18B of the second adsorption device 18 and the high temperature heat source 26. Processing returns to step 200 once the processing of step 212 has been performed.

By opening and closing the valve group 132 as described above, as illustrated in FIG. 5, at the second cooling power generation step, the first heat exchange medium that has been evaporated in the evaporator/condenser 12 is supplied from the evaporator/condenser 12 to the adsorption section 14A of the first adsorption device 14. The adsorbent of the adsorption section 14A reacts with the first heat exchange medium supplied to the adsorption section 14A, and adsorbs the first heat exchange medium.

At the second cooling power generation step, opening the valve 94 places the adsorption section 16A of the first adsorption device 16 that is in a state in which the first heat exchange medium has been adsorbed at the previous first cooling power generation step in communication with the adsorption section 18A of the second adsorption device 18. Opening the valves 100, 108 supplies the second heat exchange medium from the medium temperature heat source 24 to the pipe 18B of the second adsorption device 18. The first heat exchange medium that was adsorbed by the adsorption section 16A of the first adsorption device 16 is thereby released (desorbed) from the adsorption section 16A and is adsorbed by the adsorption section 18A of the second adsorption device 18.

Moreover, at the second cooling power generation step, opening the valves 44, 60, 84 connects together the pipe 12B of the evaporator/condenser 12, the pipe 16B of the first adsorption device 16, and the cooling load 22 in series, and the second heat exchange medium flows around a circulation path formed by these connections (a circulation path circulating around the cooling load 22→pipe 30→pipe 12B of the evaporator/condenser 12→pipe 40→pipe 56→pipe 16B of the first adsorption device 16→pipe 80→cooling load 22).

The cooling generated by the evaporator/condenser 12 and the cooling generated by the first adsorption device 16 are accordingly superimposed, and the second heat exchange medium supplied from the medium temperature heat source 24 is at a temperature of 40° C. Even under these conditions, for example, the second heat exchange medium supplied from the cooling load 22 to the pipe 12B of the evaporator/condenser 12 at a temperature of 30° C. is cooled to 23° C. at the exit of the evaporator/condenser 12, and cooled to 14° C. at the exit of the first adsorption device 16, before being supplied to the cooling load 22. Moreover, at the second cooling power generation step, as described above, nearly all of the first heat exchange medium that was adsorbed by the adsorption section 16A of the first adsorption device 16 is desorbed, and then adsorbed by the adsorbent in the adsorption section 18A of the second adsorption device 18, thereby regenerating the adsorption section 16A of the first adsorption device 16.

Second Adsorption Device Regeneration Step

Figure 6:
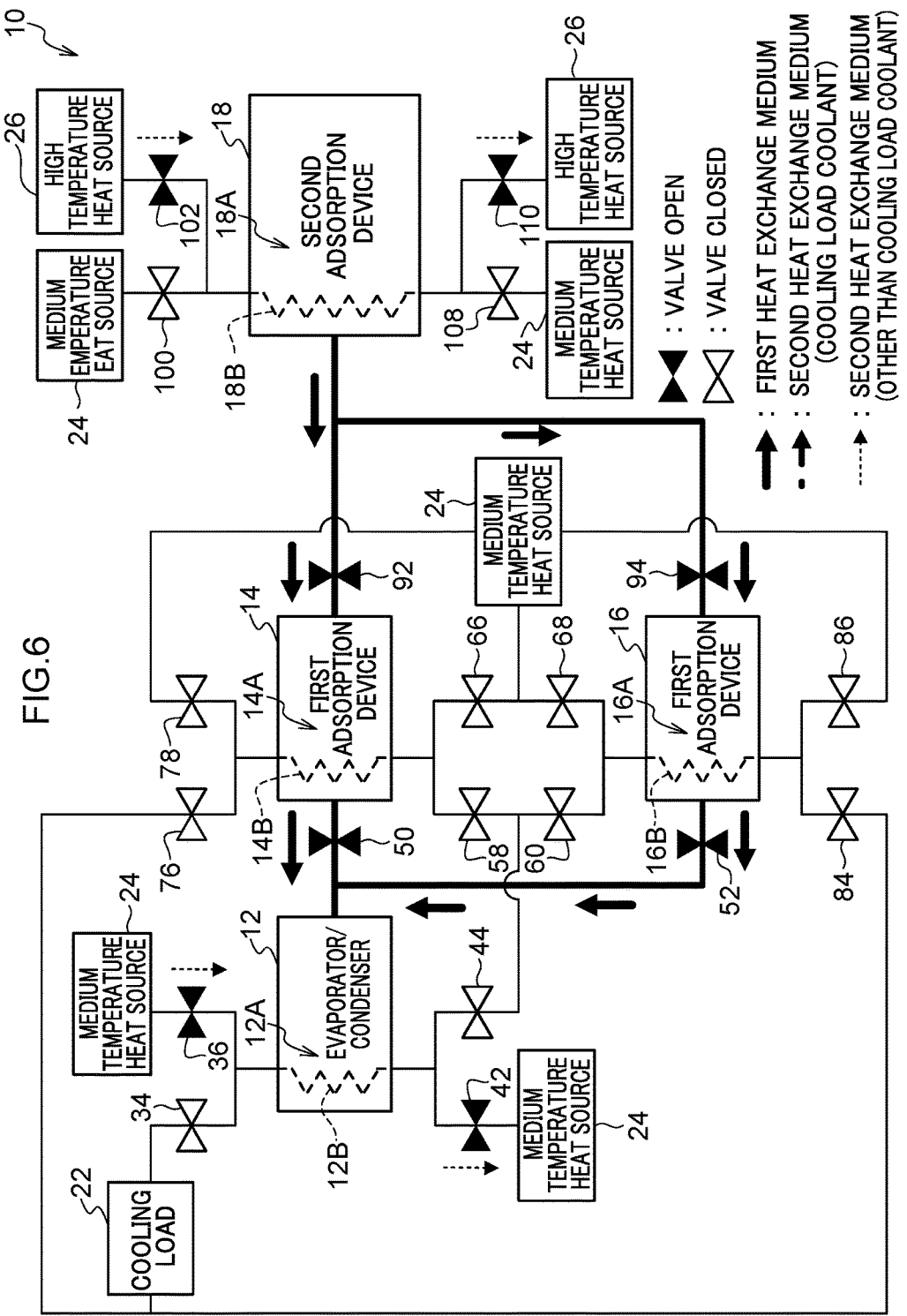
FIG. 6 is an explanatory diagram illustrating a state of an adsorption heat pump at a second adsorption device regeneration step.

When the timing for starting the second adsorption device regeneration step is reached, determination is affirmative at step 204, and the controller 20 transitions to step 214. At step 214, as illustrated in FIG. 6, the controller 20 opens each of the valves 36, 42 between the pipe 12B of the evaporator/condenser 12 and the medium temperature heat source 24, and the valves 50, 52 between the evaporation/condensation section 12A of the evaporator/condenser 12 and the adsorption sections 14A, 16A of the first adsorption devices 14, 16. The controller 20 also opens each of the valves 92, 94 between the adsorption sections 14A, 16A of the first adsorption devices 14, 16, and the adsorption section 18A of the second adsorption device 18, and the valves 102, 110 between the pipe 18B of the second adsorption device 18 and the high temperature heat source 26.

At the next step 216, as illustrated in FIG. 6, the controller 20 closes each of the valve 34 between the pipe 12B of the evaporator/condenser 12 and the cooling load 22, the valves 44, 58, 60 between the pipe 12B of the evaporator/condenser 12 and the pipes 14B, 16B of the first adsorption devices 14, 16, and the valves 76, 84 between the pipes 14B, 16B of the first adsorption devices 14, 16 and the cooling load 22. The controller 20 also closes each of the valves 66, 78, 68, 86 between the pipes 14B, 16B of the first adsorption devices 14, 16 and the medium temperature heat source 24, and the valves 100, 108 between the pipe 18B of the second adsorption device 18 and the medium temperature heat source 24. Processing returns to step 200 once the processing of step 216 has been performed.

By opening and closing the valve group 132 as described above, as illustrated in FIG. 6, at the second adsorption device regeneration step, the second heat exchange medium is supplied from the high temperature heat source 26 to the second adsorption device 18 at a high temperature, heating the adsorbent of the adsorption section 18A of the second adsorption device 18. Accordingly, the first heat exchange medium that has been adsorbed by the adsorbent of the adsorption section 18A of the second adsorption device 18 is desorbed. This thereby regenerates the adsorption section 18A of the second adsorption device 18. The first heat exchange medium desorbed from the adsorption section 18A is supplied to the evaporator/condenser 12 through the first adsorption devices 14, 16, and is condensed in the evaporator/condenser 12.

The first heat exchange medium condensed in the evaporator/condenser 12 may be discharged to outside the adsorption heat pump 10 system, or may be stored in a liquid tank, not illustrated in the drawings, before being reused as the first heat exchange medium evaporated in the evaporator/condenser 12.

Explanation has been given regarding a configuration in which, in the second adsorption device regeneration step described above, the first heat exchange medium desorbed (vaporized) from the adsorption section 18A of the second adsorption device 18 is supplied to the evaporator/condenser 12 through the first adsorption devices 14, 16; however, there is no limitation thereto. Configuration may be made in which a bypass pipe is provided to connect the adsorption section 18A of the second adsorption device 18 and the evaporation/condensation section 12A of the evaporator/condenser 12 together directly, and the first heat exchange medium may be supplied from the adsorption section 18A of the second adsorption device 18 to the evaporation/condensation section 12A of the evaporator/condenser 12 through this bypass pipe.

Explanation has been given above regarding a configuration in which the first heat exchange medium desorbed (vaporized) from the adsorption section 18A of the second adsorption device 18 is condensed in the evaporator/condenser 12; however, there is no limitation thereto. For example, the first heat exchange medium desorbed (vaporized) from the adsorption section 18A of the second adsorption device 18 may be condensed in a condenser provided separately to the evaporator/condenser 12. As another example, the first heat exchange medium desorbed (vaporized) from the adsorption section 18A of the second adsorption device 18 may be discharged to outside the adsorption heat pump 10 system without being condensed.

Explanation has been given above using the adsorption heat pump 10 as an example of a heat pump according to the present invention, and using the first adsorption device 14 and the second adsorption device 18 as examples of a first reactor and a second reactor of the present invention that are configured to adsorb and desorb the first heat exchange medium using an adsorbent. However, the first reactor and the second reactor of the present invention are not limited to configurations that adsorb and desorb the first heat exchange medium using an adsorbent. It is sufficient for it to be a reactor capable of lowering the pressure in a system by reacting with the first heat exchange medium at a pressure of the saturated vapor pressure of the first heat exchange medium or below. Such reactions include physical adsorption, chemical adsorption, absorption, chemical reactions, or the like.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A heat pump comprising:
   an evaporator/condenser including an evaporation section that evaporates a first heat exchange medium and including a flow section through which a second heat exchange medium flows, wherein the evaporator/condenser is also configured to condense the first heat exchange medium;
   a plurality of first reactors, each including a reaction section in which the first heat exchange medium that has been evaporated in the evaporator/condenser reacts and that retains the first heat exchange medium, and including a flow section through which the second heat exchange medium flows;
   a second reactor in which the first heat exchange medium, which has been released from the first reactors, reacts and that retains the first heat exchange medium; and
   a switching section comprising a controller and a valve driver that, in a case in which the reaction section of one or more of the first reactors is placed in communication with the evaporation section of the evaporator/condenser, places the reaction section of another of the first reactors in communication with the second reactor, and connects the flow section of the other first reactor that has been placed in communication with the second reactor in series with the flow section of the evaporator/condenser.

2. The heat pump of claim 1, wherein the plurality of first reactors are disposed in parallel between the evaporator/condenser and the second reactor.

3. The heat pump of claim 1, wherein the first heat exchange medium is water or ammonia, and a reactant exhibiting a reaction amount with the first heat exchange medium of 70% or more of a total reaction capacity within a relative ratio range of vapor pressure from 0.1 to 0.9 is employed as a reactant of the reaction sections of the first reactors.

4. The heat pump of claim 3, wherein a reactant that achieves an equilibrium pressure or a pressure lower than the equilibrium pressure, the equilibrium pressure being a pressure at which 70% or more of the total reaction capacity of the reactant in the first reactors can react, at a cooling power generation temperature of the first reactors of from 0° C. to 25° C., is employed as a reactant of the second reactor.

5. The heat pump of claim 1, wherein the switching section places the second reactor, which is in a state of retaining the first heat exchange medium, in communication with the evaporation section of the evaporator/condenser through the first reactors, or through a bypass pipe bypassing the first reactors.

6. A cooling power generation method, comprising:
   providing an evaporator/condenser including an evaporation section that evaporates a first heat exchange medium and including a flow section through which a second heat exchange medium flows, wherein the evaporator/condenser is also configured to condense the first heat exchange medium;
   providing a plurality of first reactors, each including a reaction section in which the first heat exchange medium that has been evaporated in the evaporator/condenser reacts and that retains the first heat exchange medium, and including a flow section through which the second heat exchange medium flows;
   providing a second reactor in which the first heat exchange medium, which has been released from the first reactors, reacts and that retains the first heat exchange medium; and
   when the reaction section of one or more of the first reactors is placed in communication with the evaporation section of the evaporator/condenser, placing the reaction section of another of the first reactors in communication with the second reactor, and connecting the flow section of the other first reactor that has been placed in communication with the second reactor in series with the flow section of the evaporator/condenser.

7. The cooling power generation method of claim 6, wherein the plurality of first reactors are disposed in parallel between the evaporator/condenser and the second reactor.

8. The cooling power generation method of claim 6, wherein the first heat exchange medium is water or ammonia, and a reactant exhibiting a reaction amount with the first heat exchange medium of 70% or more of a total reaction capacity within a relative ratio range of vapor pressure from 0.1 to 0.9 is employed as a reactant of the reaction sections of the first reactors.

9. The cooling power generation method of claim 8, wherein a reactant that achieves an equilibrium pressure or a pressure lower than the equilibrium pressure, the equilibrium pressure being a pressure at which 70% or more of the total reaction capacity of the reactant in the first reactors can react, at a cooling power generation temperature of the first reactors of from 0° C. to 25° C., is employed as a reactant of the second reactor.

10. The cooling power generation method of claim 6, further comprising:
  placing the second reactor, which is in a state of retaining the first heat exchange medium, in communication with the evaporation section of the evaporator/condenser through the first reactors, or through a bypass pipe bypassing the first reactors.

* * * * *

UNITED STATES PATENT AND TRADEMARK OFFICE
CERTIFICATE OF CORRECTION

PATENT NO. : 10,309,694 B2
APPLICATION NO. : 15/057690
DATED : June 4, 2019
INVENTOR(S) : Yasuki Hirota et al.

It is certified that error appears in the above-identified patent and that said Letters Patent is hereby corrected as shown below:

On the Title Page

Item (72), Column 1, under 'Inventors' please change:
"Manabu Orihashi, Okazaka (JP)" to --Manabu Orihashi, Okazaki (JP)--

Signed and Sealed this
Thirteenth Day of August, 2019

Andrei Iancu
*Director of the United States Patent and Trademark Office*